(12) United States Patent
Lien (10) Patent No.: US 11,033,047 B2
(45) Date of Patent: Jun. 15, 2021

(54) EASY-CLEANING JUICING NET STRUCTURE OF JUICING DEVICE

(71) Applicants: Chin Jui Lien, Taichung (TW); Yi Wang Kuo, New Taipei (TW)

(72) Inventor: Chin Jui Lien, Taichung (TW)

(73) Assignees: Chin Jui Lien, Taichung (TW); Yi Wang Kuo, New Taipei (TW)

(*) Notice: Subject to any disclaimer, the term of this patent is extended or adjusted under 35 U.S.C. 154(b) by 290 days.

(21) Appl. No.: 16/208,998

(22) Filed: Dec. 4, 2018

(65) Prior Publication Data

US 2020/0146328 A1    May 14, 2020

(30) Foreign Application Priority Data

Nov. 13, 2018  (TW) ................................ 107215380

(51) Int. Cl.
| | |
|---|---|
| *A23N 1/00* | (2006.01) |
| *A23N 1/02* | (2006.01) |
| *A47J 19/02* | (2006.01) |
| *A47J 19/06* | (2006.01) |

(52) U.S. Cl.
CPC .............. *A23N 1/02* (2013.01); *A47J 19/025* (2013.01); *A47J 19/06* (2013.01)

(58) Field of Classification Search
CPC ......... A23N 1/02; A47J 19/025; A47J 19/027; A47J 19/06; A47J 43/046
USPC .................................................. 99/510, 513
See application file for complete search history.

(56) References Cited

FOREIGN PATENT DOCUMENTS

| FR | 2967034 A1 | * | 5/2012 | ............... B30B 9/14 |
| KR | 101408892 B1 | * | 6/2014 | ............ A47J 19/025 |
| WO | WO-2019088674 A1 | * | 5/2019 | ............ A47J 19/025 |
| WO | WO-2019156354 A1 | * | 8/2019 | ............. A47J 19/02 |

* cited by examiner

*Primary Examiner* — Reginald Alexander
(74) *Attorney, Agent, or Firm* — Wang Law Firm, Inc.

(57) ABSTRACT

An easy-cleaning juicing net structure of a juicing device includes a juice cup, a juicing net cup, a spiral pushing and extruding body and a feeding cup cover. The juicing net cup is received into the juice cup; the spiral pushing and extruding body is received into the juicing net cup; and the feeding cup cover is covered onto the juice cup. The juice cup and the juicing net cup are provided for juicing and filtering food residue to achieve the effect of separating the juice and the residue during a juicing process. No dead spot exists after the juicing net cup is detached from the juice cup to facilitate the cleaning and preventing the residue from being stuck at the corners during the cleaning process, so as to achieve the effects of good functionality and high convenience.

14 Claims, 6 Drawing Sheets

EASY-CLEANING JUICING NET STRUCTURE OF JUICING DEVICE

FIELD OF THE INVENTION

The present invention relates to the field an easy-cleaning juicing net structure, and more particularly to the easy-cleaning juicing net structure used in a juicing device.

BACKGROUND OF THE INVENTION

Figure 6:
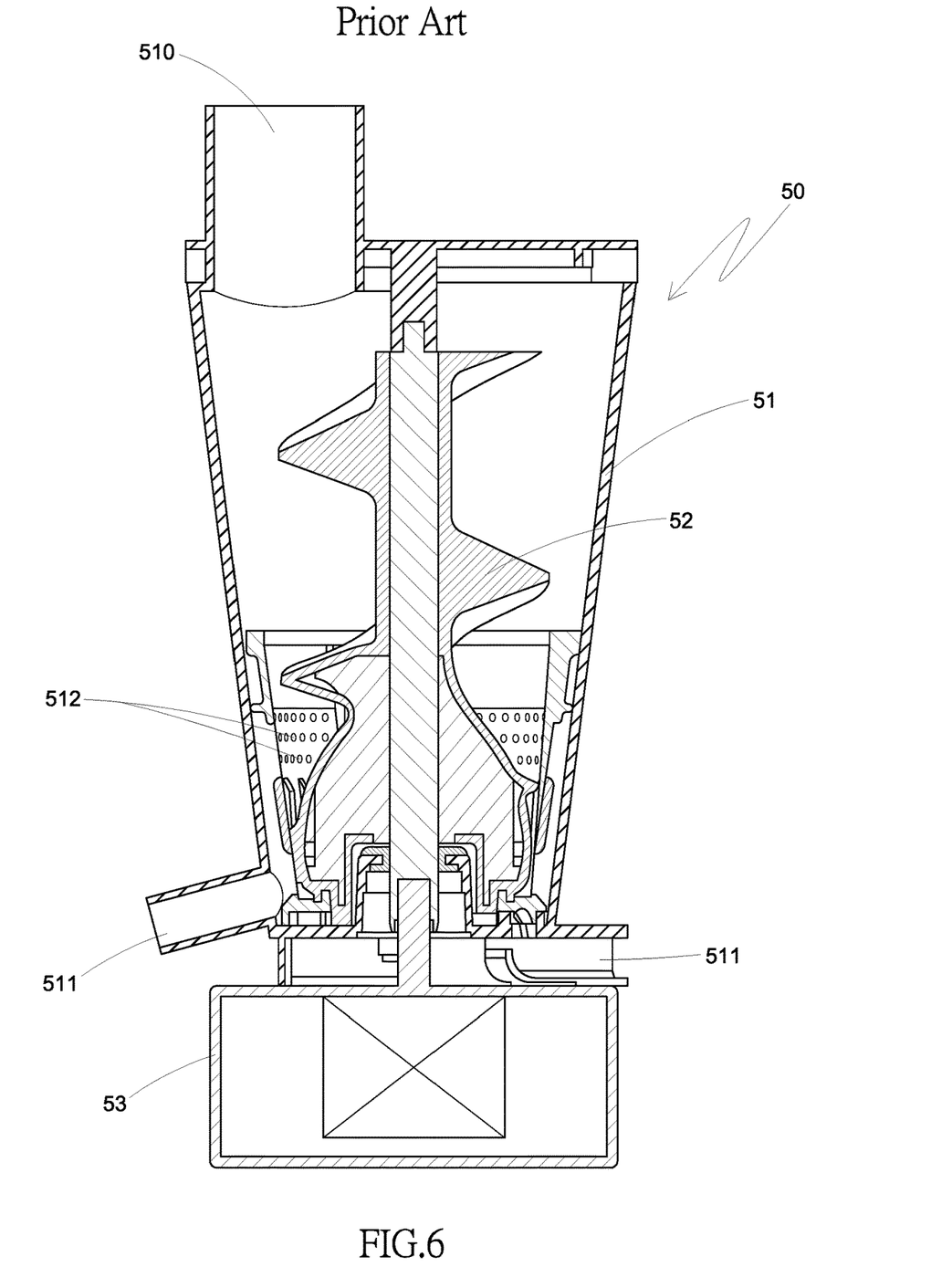
FIG. 6 is a schematic view of a conventional juicing device.

With reference to FIG. 6 for a conventional juicing device, the conventional juice device has a squeeze tube assembly 50 including a squeeze tube 51 and a squeeze device 52, and the squeeze tube 51 has an inlet 510, an outlet 511, and a plurality of juice output holes 512 formed on the sidewall of the squeeze tube 51, and the squeeze device 52 is installed in the squeeze tube 51, and the squeeze tube 51 is installed onto a juice container 53. When the squeeze device 52 is operated, a fruit is entered into the inlet 510 formed at the top of the squeeze tube 51, and the squeeze device 52 squeezes and presses the fruit in the squeeze tube 51, and the fruit juice flows from the juice output hole 512 into the juice container 53 (not shown in the figure), and the fruit residue is discharged from the outlet 511 formed at the bottom of the squeeze tube 51 to achieve the effect of separating the juice and the residue, but the size of the juice output hole 512 of the squeeze tube 51 of the squeeze tube assembly 50 is fixed. When fruits with different fiber textures are squeezed, the fruit with finer fibers will not be squeezed completely, the fruit fibers together with the fruit juice are discharged from the juice output hole 512. The fruit residue produced after the squeezing may be remained at the surrounding of the juice output hole 512, and thus making the use and cleaning inconvenient. Obviously, further improvements are required.

In view of the aforementioned drawbacks of the prior art, the inventor of the present invention based on years of experience to conduct extensive research and experiment, and finally provided a feasible solution to overcome the drawbacks of the prior art.

SUMMARY OF THE INVENTION

Therefore, it is a primary objective of the present invention to overcome the drawbacks of the conventional juicing device with poor squeezing and inconvenient cleaning effects by providing an easy-cleaning juicing net structure of a juicing device in accordance with the present invention.

To achieve the aforementioned and other objectives, the present invention provides an easy-cleaning juicing net structure of a juicing device, comprising a juice cup, a juicing net cup, a spiral pushing and extruding body and a feeding cup cover, characterized in that the juice cup has an inner cup portion disposed therein, a positioning seat disposed at the center of the bottom of the inner cup portion, an inner peripheral sidewall disposed around the inner cup portion, a plurality of extruding strips disposed with a gap from the inner peripheral sidewall and each extruding strip having a thickness d, a plurality of cup buckles disposed at an opening of the inner cup portion, a blocking rib extended from a side edge of the cup buckle towards the inner peripheral sidewall, a residue outlet and a juice outlet formed on the outer side of the juice cup proximate to the bottom, and the residue outlet and juice outlet penetrating through the inner cup portion, a plurality of grinding ribs arranged with an interval apart from each other and protruded from the inner wall of the juicing net cup, a juice-squeezing hole formed adjacent to the grinding rib and having a width D equal to 1 mm~10 mm, a residue separating strip disposed between the juice-squeezing hole and the grinding rib, a shaft seat disposed at the center of the juicing net cup, a seal ring and a residue guiding opening disposed at the bottom of the shaft seat, and a plurality of reinforcing ribs arranged with an interval apart from each other and disposed around the outer wall of the juicing net cup. Wherein, the reinforcing rib has an end in a planar shape, and the spiral pushing and extruding body has a mandrel, and the spiral pushing and extruding body has an extruding portion spirally formed on the outer side of the spiral pushing and extruding body, and the feeding cup cover has a feed cover blocking rib, a plurality of buckle portions arranged with an interval apart from each other and disposed at the bottom of the feed cover blocking rib, a feed inlet penetrated through the top of the feeding cup cove, an upper shaft seat disposed adjacent to the feed inlet, and the juicing net cup is received into the inner cup portion of the juice cup, and a positioning seat is disposed at the bottom of the shaft seat and the seal ring of the juicing net cup opposite to the inner cup portion of the juice cup, and the planar shaped end of the reinforcing rib of the juicing net cup abuts an inner peripheral sidewall of the inner cup portion of the juice cup, and the distance L between the juicing net cup and the inner peripheral sidewall of the inner cup portion is greater than 1 mm, and the plurality of extruding strips of the inner peripheral sidewall of the inner cup portion of the juice cup are inserted into the juice-squeezing holes of the juicing net cup respectively. The gap produced after the plurality of extruding strips are inserted into the juice-squeezing holes forms a filter hole, and the spiral pushing and extruding body is received into the juicing net cup, and a side of the mandrel of the spiral pushing and extruding body is positioned and pivotally coupled to the shaft seat and the seal ring of the juicing net cup, and the feeding cup cover is covered onto the juice cup. The plurality of buckle portions of the feed cover blocking rib of the feeding cup cover is latched and fixed to the plurality of cup buckles disposed at the opening of the inner cup portion of the juice cup, and the upper shaft seat of the feeding cup cover is pivotally coupled to the other side of the mandrel of the spiral pushing and extruding body. Food is fed through the feed inlet of the feeding cup cover into the juicing net cup. When the spiral pushing and extruding body is rotated by a driving force, the extruding portion of the spiral pushing and extruding body and the plurality of grinding ribs of the juicing net cup extruded and grind the food. After the food is extruded and ground to produce a juice which flows into the juice cup from the filter holes formed by the plurality of extruding strips of the juice cup and the juice-squeezing holes of the juicing net cup. The food residue produced after the food is extruded and ground, the good residue is guided into the juice cup from the residue guiding opening of the juicing net cup to the outside through the residue outlet to achieve the effect of separating the juice and residue in the juicing process effectively. After the extruding strips of the juice cup are removed and separated from the juice-squeezing holes of the juicing net cup, the overall cleaning becomes much easier and more convenient, and almost no dead spot exists in the juice-squeezing holes, and thus preventing residues from remaining at the corners. In addition, the plurality of reinforcing ribs arranged with an interval apart from one another and disposed around the outer wall of the juicing net cup are substantially in a semicircular sheet shape, and an endpoint of the circular arc of the semicircular sheet shape of the reinforcing rib abuts the inner peripheral sidewall of the inner cup portion of the juice cup to improve the stability of binding the juicing net cup and the juice cup and provide better functionality and convenience.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

With reference to FIGS. 1 to 4 for a perspective partially-assembled view, an exploded view, and a side cross-sectional view of an easy-cleaning juicing net structure of a juicing device, and a top view of the juicing net cup in accordance with the present invention respectively, the easy-cleaning juicing net structure comprises:

a juice cup 10, having an inner cup portion 11 disposed therein, a positioning seat 110 disposed at the center of the bottom of the inner cup portion 11, an inner peripheral sidewall 111 disposed around the inner cup portion 11, a plurality of extruding strips 111A disposed with a gap from the inner peripheral sidewall 111 and protruded from the inner peripheral sidewall 111, and the extruding strip 111A having a thickness d, and a plurality of cup buckles 112 being disposed at an opening of the inner cup portion 11, and a blocking rib 113 being extended from a side edge of the cup buckle 112 towards the inner peripheral sidewall 111, and a residue outlet 12 and a juice outlet 13 formed on the outer side of the juice cup 10 proximate to the bottom edge, and the residue outlet 12 and the juice outlet 13 penetrating through the inner cup portion 11;

a juicing net cup 20, having a plurality of grinding ribs 21 arranged with an interval apart from each other and protruded from the inner wall of the juicing net cup 20, a juice-squeezing hole 22 formed at and penetrated through a position adjacent to the grinding rib 21, and the juice-squeezing hole 22 having a width D equal to 1 mm~10 mm, and a residue separating strip 23 being installed between the juice-squeezing hole 22 and the grinding rib 21, and a shaft seat 24 being disposed at the center of the juicing net cup 20, and a seal ring 25 and a residue guiding opening 26 being disposed at the bottom of the shaft seat 24, and a plurality of reinforcing ribs 27 being arranged with an interval apart from each other and disposed around the outer wall of the juicing net cup 20, and the reinforcing rib 27 having an end in a planar shape, and the juicing net cup 20 being received in the inner cup portion 11 of the juice cup 10, and a positioning seat 110 being disposed at the bottom of the shaft seat 24 and the seal ring 25 opposite to the inner cup portion 11, and the planar end of the reinforcing rib 27 of the juicing net cup 20 abutting the inner peripheral sidewall 111 of the inner cup portion 11 of the juice cup 10, and the distance L defined between the juicing net cup 20 and the inner peripheral sidewall 111 of the inner cup portion 11 being over 1 mm, and the plurality of extruding strips 111A formed on the inner peripheral sidewall 111 of the inner cup portion 11 being inserted into the juice-squeezing holes 22 respectively, and a filter hole being formed by the gap produced after the plurality of extruding strips 111A are inserted into the juice-squeezing holes 22;

a spiral pushing and extruding body 30, having a mandrel 31, an extruding portion 32 spirally formed on the outer side of the spiral pushing and extruding body 30, and the spiral pushing and extruding body 30 being received in the juicing net cup 20, and a side of the mandrel 31 being positioned and pivotally coupled to the shaft seat 24 and the seal ring 25 of the juicing net cup 20; and a feeding cup cover 40, having a feed cover blocking rib 41, plurality of buckle portions 410 disposed with an interval apart from each other and at the bottom of the feed cover blocking rib 41, a feed inlet 42 penetrating through the top of the feeding cover 40, an upper shaft seat 43 disposed adjacent to the feed inlet 42, and the feeding cup cover 40 being covered onto the juice cup 10, and the plurality of buckle portions 410 of the feed cover blocking rib 41 being latched and fixed to the plurality of cup buckles 112 formed at the opening of the inner cup portion 11 of the juice cup 10, and the upper shaft seat 43 being pivotally coupled to the other side of the mandrel 31 of the spiral pushing and extruding body 30.

The aforementioned components and structure constitutes the easy-cleaning juicing net structure of the juicing device of the present invention.

Figure 1:
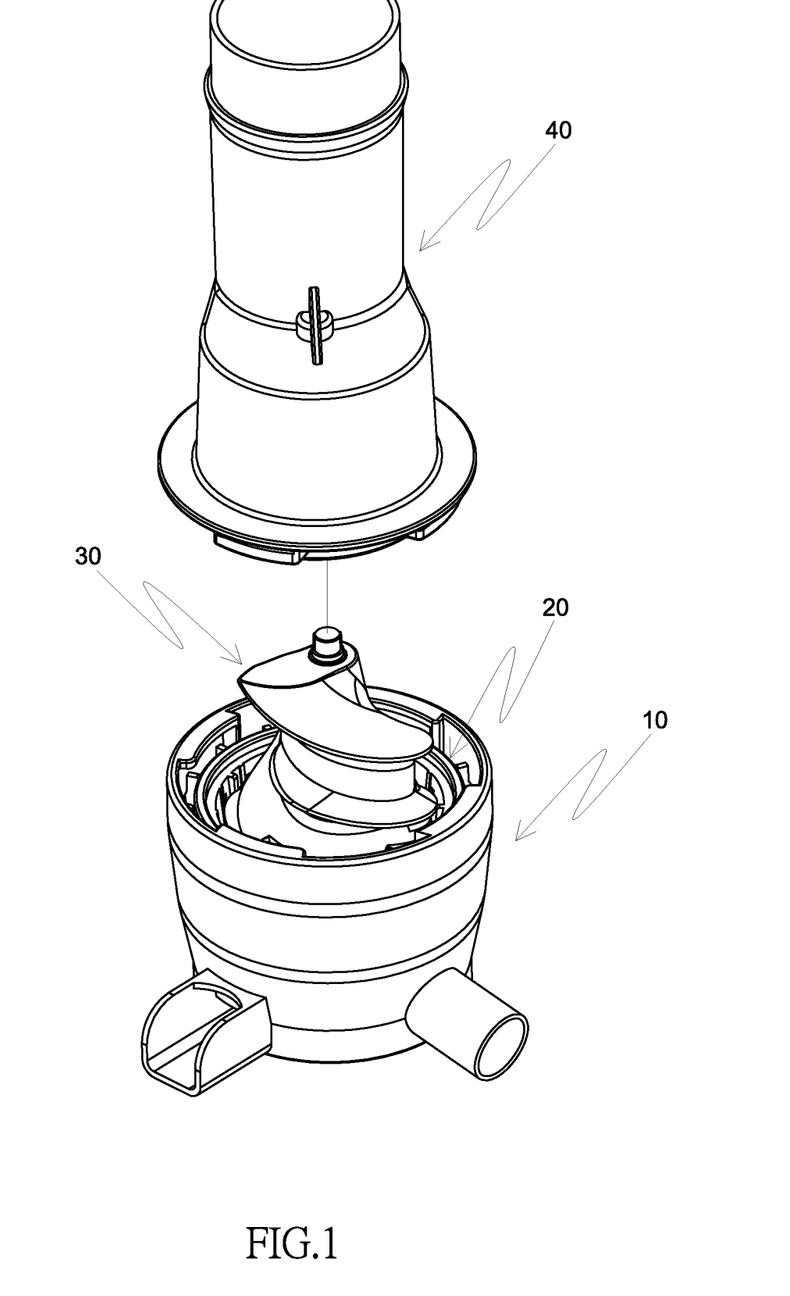
FIG. 1 is a perspective partially-assembled view of an easy-cleaning juicing net structure of a juicing device in accordance with the present invention.
Figure 2:
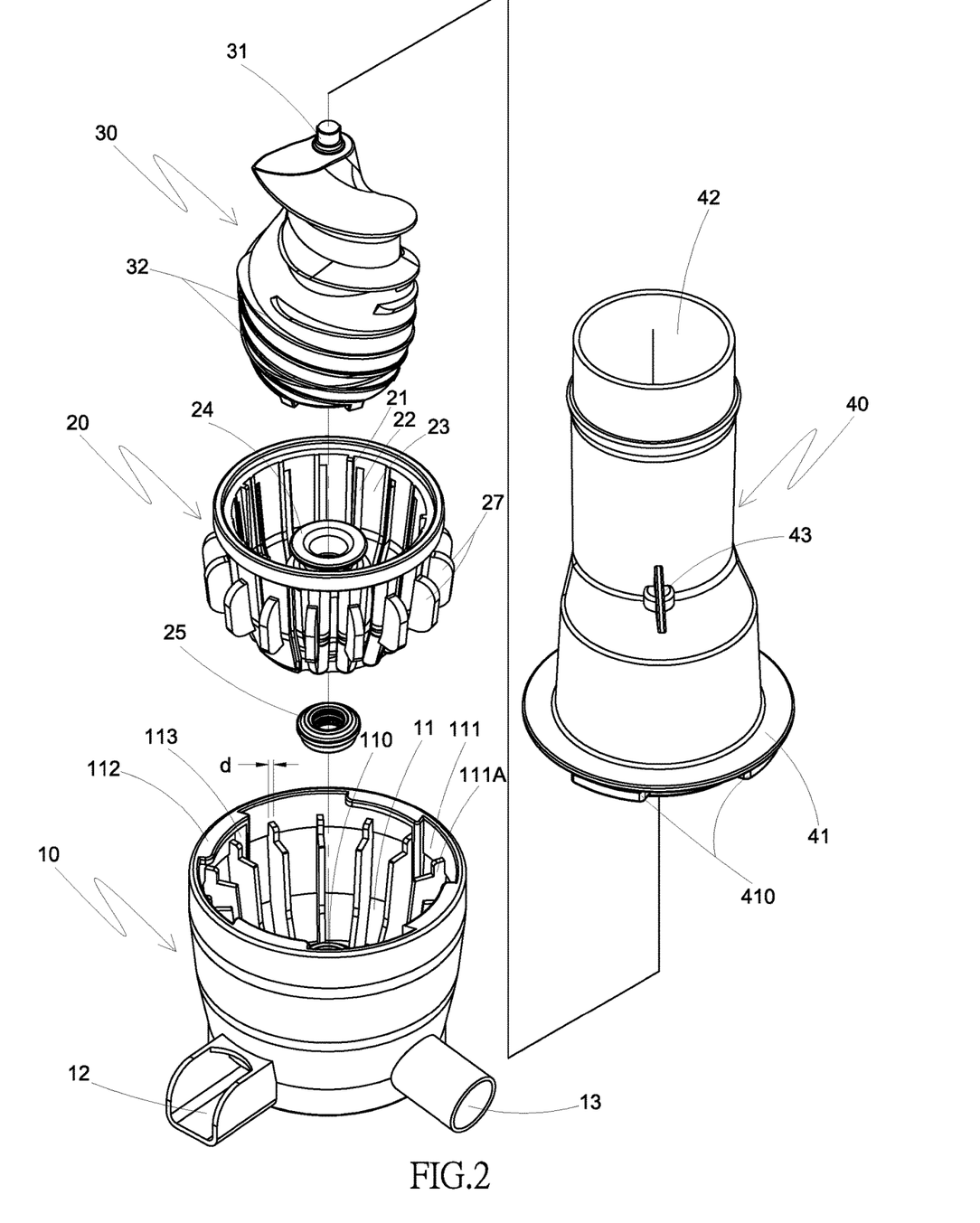
FIG. 2 is an exploded view of an easy-cleaning juicing net structure of a juicing device in accordance with the present invention.
Figure 3:
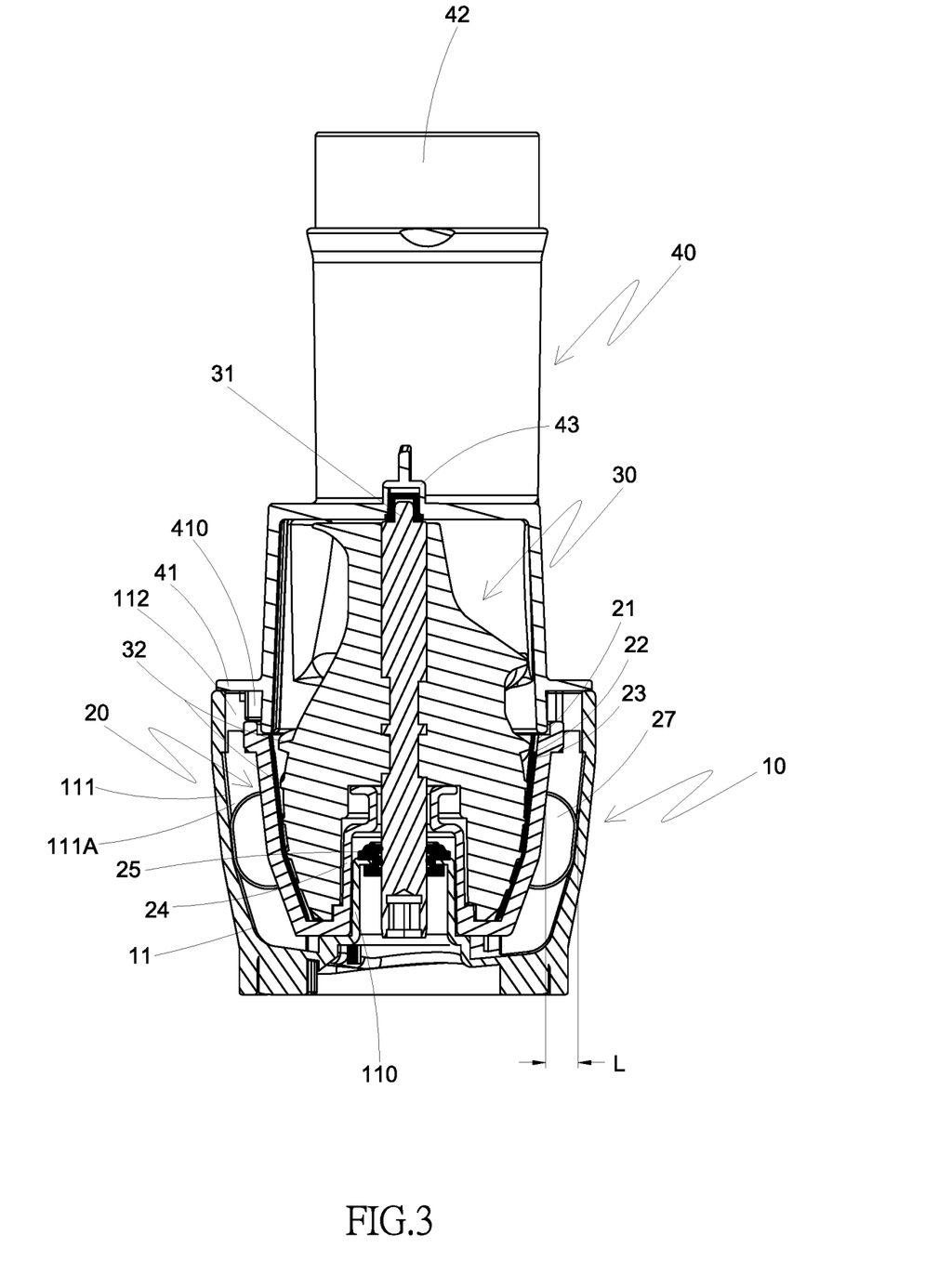
FIG. 3 is a cross-sectional side view of an easy-cleaning juicing net structure of a juicing device in accordance with the present invention.
Figure 4:
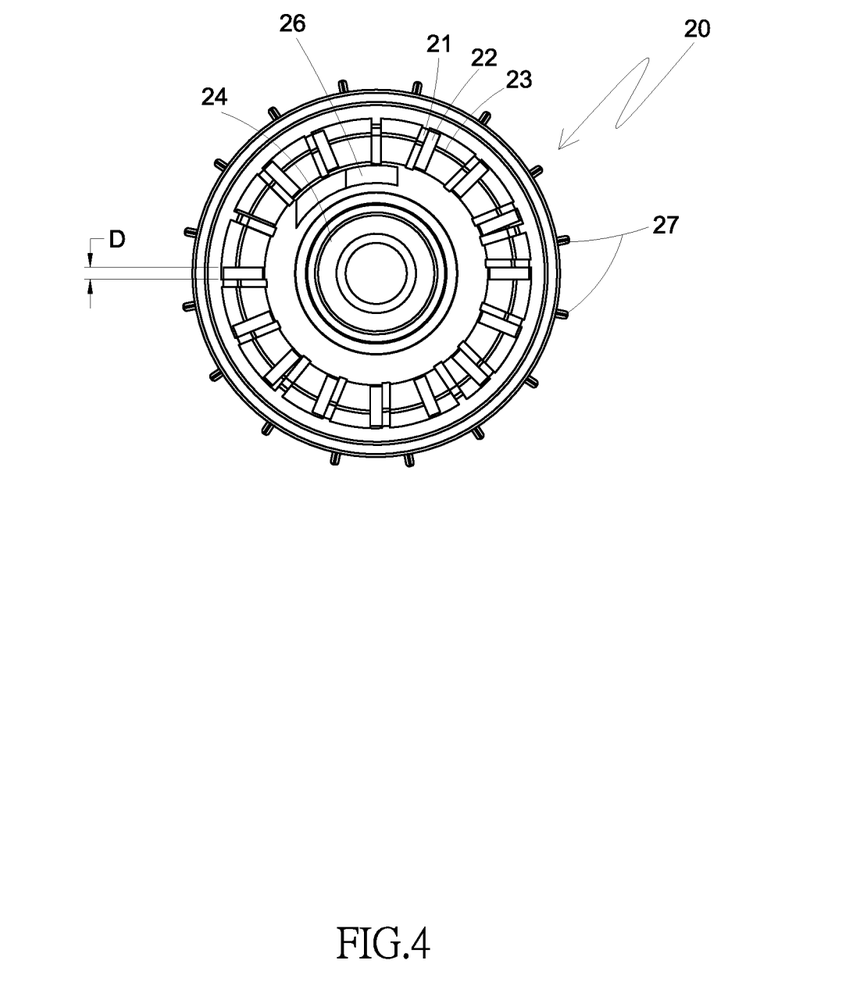
FIG. 4 is a top view of a juicing net cup of an easy-cleaning juicing net structure of a juicing device in accordance with the present invention.

With reference to FIGS. 2 to 4 for an exploded view and a cross-sectional side view of a juicing device and a top view of a juicing net cup in accordance with the present invention respectively, the juicing net cup 20 is received in the inner cup portion 11 of the juice cup 10, and a positioning seat 110 is disposed at the bottom of the shaft seat 24 and the seal ring 25 of the juicing net cup 20 opposite to the juice cup 10, and the distance L defined between the juicing net cup 20 and the inner peripheral sidewall 111 of the inner cup portion 11 of the juice cup 10 is over 1 mm, and a plurality of extruding strips 111A of the inner peripheral sidewall 111 of the inner cup portion 11 of the juice cup 10 are inserted into the juice-squeezing holes 22 of the juicing net cup 20 respectively. A filter hole is formed by the gap produced after the plurality of extruding strips 111A are inserted into the juice-squeezing holes 22, and the spiral pushing and extruding body 30 is received into the juicing net cup 20, and a side of the mandrel 31 of the spiral pushing and extruding body 30 is positioned and pivotally coupled to the shaft seat 24 and the seal ring 25 of the juicing net cup 20, and the feeding cup cover 40 is covered onto the juice cup 10, and the plurality of buckle portions 410 of the feeding cup cover 40 are latched and fixed to the plurality of cup buckles 112 formed at the opening of the inner cup portion 11 of the juice cup 10, and the upper shaft seat 43 of the feeding cup cover 40 is pivotally coupled to the other side of the mandrel 31 of the spiral pushing and extruding body 30. When food is passed through the feed inlet 42 of the feeding cover 40 into the juicing net cup 20 and the spiral pushing and extruding body 30 is driven by a driving force, the extruding portion 32 of the spiral pushing and the plurality of grinding ribs 21 of the juicing net cup 20 of the extruding body 30 extrude and grind the food to produce a juice, and the juice flows into the juice cup 10 from the filter holes formed by the plurality of extruding strips 111A and the juice-squeezing holes 22 of the juicing net cup 20. The food residue produced after the food is extruded and ground, the food residue flows into the residue outlet 12 from the residue guiding opening 26 of the juicing net cup 20 to achieve the effect of separating the juice and the residue in the juicing process effectively. After the extruding strips 111A of the juice cup 10 are detached and separated from the juice-squeezing holes 22 of the juicing net cup 20, the overall cleaning becomes much easier and more convenient, and almost no dead spot exists in the juice-squeezing holes, and thus preventing residues from remaining at the corners to provide better functionality and convenience.

Figure 5:
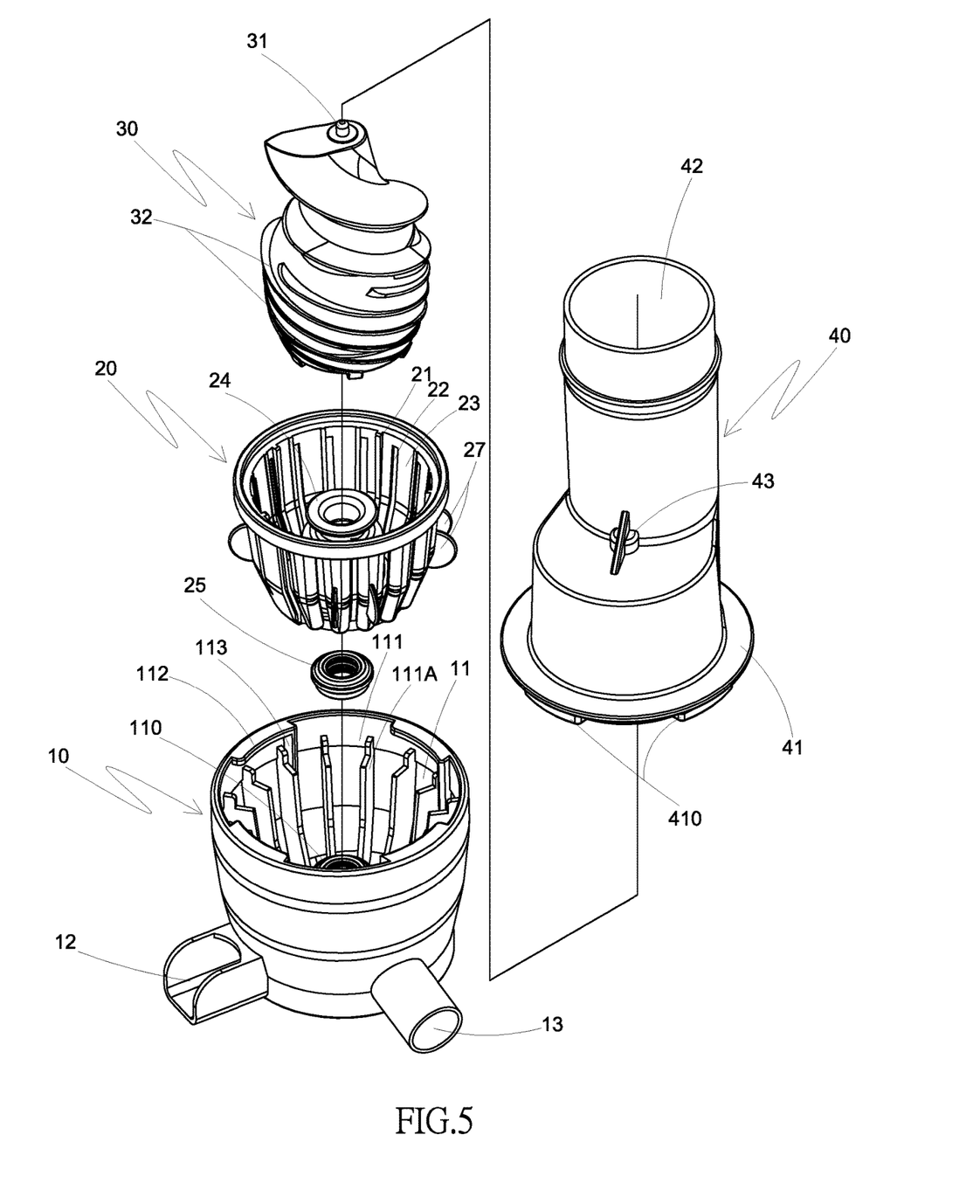
FIG. 5 is an exploded view of an easy-cleaning juicing net structure of a juicing device having a juicing net cup with a plurality of semicircular reinforcing ribs formed on the outer wall of the juicing net cup in accordance with an embodiment of the present invention.

With reference to FIG. 5 for an exploded view of an easy-cleaning juicing net structure of a juicing device having a juicing net cup with a plurality of semicircular reinforcing ribs formed on the outer wall of the juicing net cup in according to an embodiment of the present invention, the plurality of semicircular reinforcing ribs formed on the outer wall of the juicing net cup have substantially the same structure as those as shown in FIGS. 1 to 5, except that the reinforcing ribs 27 are in a semicircular sheet shape, and an endpoint of the circular arc of the semicircular sheet shape of the reinforcing rib 27 abuts the inner peripheral sidewall 111 of the inner cup portion 11 of the juice cup 10 to improve the stability of binding the juicing net cup 20 and the juice cup 10 and the multifunction of the present invention.

While the present invention has been described by means of specific embodiments, numerous modifications and variations could be made thereto by those skilled in the art without departing from the scope and spirit of the present invention set forth in the claims.

What is claimed is:

1. An easy-cleaning juicing net structure of a juicing device, comprising:
    a juice cup, having an inner cup portion disposed therein, a positioning seat disposed at the center of the bottom of the inner cup portion, an inner peripheral sidewall disposed around the inner cup portion, a plurality of extruding strips disposed with a gap from the inner peripheral sidewall and protruded from the inner peripheral sidewall, a residue outlet and a juice outlet formed on the outer side of the juice cup proximate to the bottom edge, and the residue outlet and the juice outlet penetrating through the inner cup portion; and
    a juicing net cup, having a plurality of juice-squeezing holes arranged with an interval apart from each other and penetrated through the inner wall of the juicing net cup, a residue separating strip disposed between two adjacent juice-squeezing holes, a shaft seat disposed at the center of the juicing net cup, and a seal ring and a residue guiding opening disposed at the bottom of the shaft seat, and the juicing net cup being received in the inner cup portion of the juice cup, and the positioning seat being disposed at the bottom of the shaft seat and the seal ring opposite to the inner cup portion, and the plurality of extruding strips disposed at the inner peripheral sidewall of the inner cup portion being inserted into the corresponding juice-squeezing holes respectively, and a filter hole being formed by the gap produced after the plurality of extruding strips are inserted into the corresponding juice-squeezing holes,
    wherein the juicing net cup has a plurality of reinforcing ribs arranged with an interval apart from each other and disposed around the outer wall of the juicing net cup, and each of the reinforcing ribs has an end in a planar shape, and the reinforcing ribs abut against the inner peripheral sidewall of the inner cup portion of the juice cup.

2. The easy-cleaning juicing net structure of a juicing device according to claim 1, wherein the extruding strip of the inner peripheral sidewall disposed at the inner cup portion of the juice cup has a thickness d, and the juice-squeezing hole formed at the juicing net cup has a width D, and the thickness d of the extruding strip is smaller than the width D of the juice-squeezing hole.

3. The easy-cleaning juicing net structure of a juicing device according to claim 2, wherein the juice-squeezing hole has a width D equal to 1 mm~10 mm.

4. The easy-cleaning juicing net structure of a juicing device according to claim 1, wherein the juicing net cup and the inner peripheral sidewall disposed at the inner cup portion of the juice cup has a distance L defined therebetween, and the distance L is greater than 1 mm.

5. The easy-cleaning juicing net structure of a juicing device according to claim 1, further comprising a grinding rib protruded from a position adjacent to the plurality of juice-squeezing holes formed at the inner wall of the juicing net cup.

6. The easy-cleaning juicing net structure of a juicing device according to claim 1, wherein the juicing net cup further has a spiral pushing and extruding body installed therein, and the spiral pushing and extruding body has a mandrel, and the spiral pushing and extruding body has an extruding portion spirally formed on the outer side of the spiral pushing and extruding body, and the spiral pushing and extruding body is received into the juicing net cup, and a side of the mandrel is positioned and pivotally coupled to a shaft seat of the juicing net cup and a seal ring; and the juice cup further has a feeding cup cover covering thereon, and the feeding cover has a feed inlet penetrating through the top of the feeding cover, and an upper shaft seat is disposed adjacent to the feed inlet, and the feeding cup cover is covered onto the juice cup, and the upper shaft seat is pivotally coupled to a mandrel on the other side of the spiral pushing and extruding body.

7. The easy-cleaning juicing net structure of a juicing device according to claim 6, wherein the juice cup has a plurality of cup buckles disposed at an opening of the inner cup portion, a blocking rib extended from a side edge of the cup buckle towards the inner peripheral sidewall, and the feeding cup cover has a feed cover blocking rib, and a plurality of buckle portions disposed with an interval apart from each other and at the bottom of the feed cover blocking rib, and the plurality of buckle portions formed at the feed cover blocking rib are latched and fixed to the plurality of cup buckles disposed at the opening of the inner cup portion of the juice cup respectively.

8. An easy-cleaning juicing net structure of a juicing device, comprising:
    a juice cup, having an inner cup portion disposed therein, a positioning seat disposed at the center of the bottom of the inner cup portion, an inner peripheral sidewall disposed around the inner cup portion, a plurality of extruding strips disposed with a gap from the inner peripheral sidewall and protruded from the inner peripheral sidewall, a residue outlet and a juice outlet formed on the outer side of the juice cup proximate to the bottom edge, and the residue outlet and the juice outlet penetrating through the inner cup portion; and a juicing net cup, having a plurality of juice-squeezing holes arranged with an interval apart from each other and penetrated through the inner wall of the juicing net cup, a residue separating strip disposed between two adjacent juice-squeezing holes, a shaft seat disposed at the center of the juicing net cup, and a seal ring and a residue guiding opening disposed at the bottom of the shaft seat, and the juicing net cup being received in the inner cup portion of the juice cup, and the positioning seat being disposed at the bottom of the shaft seat and the seal ring opposite to the inner cup portion, and the plurality of extruding strips disposed at the inner peripheral sidewall of the inner cup portion being inserted into the corresponding juice-squeezing holes respectively, and a filter hole being formed by the gap produced after the plurality of extruding strips are inserted into the corresponding juice-squeezing holes, wherein the juicing net cup has a plurality of reinforcing ribs arranged with an interval apart from each other and disposed around the outer wall of the juicing net cup, and each of the reinforcing ribs is in a semicircular sheet shape, and an arc endpoint of the semicircular sheet shape of the reinforcing rib abuts the inner peripheral sidewall of the inner cup portion of the juice cup.

9. The easy-cleaning juicing net structure of a juicing device according to claim 8, wherein the extruding strip of the inner peripheral sidewall disposed at the inner cup portion of the juice cup has a thickness d, and the juice-squeezing hole formed at the juicing net cup has a width D, and the thickness d of the extruding strip is smaller than the width D of the juice-squeezing hole.

10. The easy-cleaning juicing net structure of a juicing device according to claim 9, wherein the juice-squeezing hole has a width D equal to 1 mm~10 mm.

11. The easy-cleaning juicing net structure of a juicing device according to claim 8, wherein the juicing net cup and the inner peripheral sidewall disposed at the inner cup portion of the juice cup has a distance L defined therebetween, and the distance L is greater than 1 mm.

12. The easy-cleaning juicing net structure of a juicing device according to claim 8, further comprising a grinding rib protruded from a position adjacent to the plurality of juice-squeezing holes formed at the inner wall of the juicing net cup.

13. The easy-cleaning juicing net structure of a juicing device according to claim 8, wherein the juicing net cup further has a spiral pushing and extruding body installed therein, and the spiral pushing and extruding body has a mandrel, and the spiral pushing and extruding body has an extruding portion spirally formed on the outer side of the spiral pushing and extruding body, and the spiral pushing and extruding body is received into the juicing net cup, and a side of the mandrel is positioned and pivotally coupled to a shaft seat of the juicing net cup and a seal ring; and the juice cup further has a feeding cup cover covering thereon, and the feeding cover has a feed inlet penetrating through the top of the feeding cover, and an upper shaft seat is disposed adjacent to the feed inlet, and the feeding cup cover is covered onto the juice cup, and the upper shaft seat is pivotally coupled to a mandrel on the other side of the spiral pushing and extruding body.

14. The easy-cleaning juicing net structure of a juicing device according to claim 13, wherein the juice cup has a plurality of cup buckles disposed at an opening of the inner cup portion, a blocking rib extended from a side edge of the cup buckle towards the inner peripheral sidewall, and the feeding cup cover has a feed cover blocking rib, and a plurality of buckle portions disposed with an interval apart from each other and at the bottom of the feed cover blocking rib, and the plurality of buckle portions formed at the feed cover blocking rib are latched and fixed to the plurality of cup buckles disposed at the opening of the inner cup portion of the juice cup respectively.

\* \* \* \* \*